(12) United States Patent
List et al.

(10) Patent No.: US 8,133,589 B2
(45) Date of Patent: Mar. 13, 2012

(54) TEMPERABLE GLASS COATING

(75) Inventors: Matthias List, Dresden (DE); Gerd Kleideiter, Ahaus (DE); Udo Schreiber, Jossgrund (DE); Sven Schramm, Würzburg (DE)

(73) Assignee: Applied Materials, Inc., Santa Clara, CA (US)

( * ) Notice: Subject to any disclaimer, the term of this patent is extended or adjusted under 35 U.S.C. 154(b) by 1023 days.

(21) Appl. No.: 11/769,934

(22) Filed: Jun. 28, 2007

(65) Prior Publication Data

US 2008/0220261 A1 Sep. 11, 2008

Related U.S. Application Data

(60) Provisional application No. 60/893,764, filed on Mar. 8, 2007.

(51) Int. Cl.
*B32B 9/00* (2006.01)

(52) U.S. Cl. ........................................ 428/432; 428/434

(58) Field of Classification Search .................. 428/428, 428/432, 689, 697, 701, 702
See application file for complete search history.

(56) References Cited

U.S. PATENT DOCUMENTS

| | | | |
|---|---|---|---|
| 6,387,515 | B1 | 5/2002 | Joret et al. |
| 6,576,349 | B2 | 6/2003 | Lingle et al. |
| 6,605,358 | B1 | 8/2003 | Stachowiak |
| 6,686,050 | B2 | 2/2004 | Lingle et al. |
| 6,942,923 | B2 * | 9/2005 | Stachowiak .................. 428/428 |
| 2003/0049464 | A1 * | 3/2003 | Glenn et al. .................. 428/432 |
| 2005/0186482 | A1 * | 8/2005 | Maschwitz .................. 430/1 |
| 2006/0083932 | A1 | 4/2006 | Kleideiter et al. |
| 2006/0257670 | A1 | 11/2006 | Brochot et al. |

FOREIGN PATENT DOCUMENTS

| | | |
|---|---|---|
| DE | 198 50 023 A1 | 5/2000 |
| EP | 0 506 507 A | 9/1992 |
| EP | 0 646 551 A | 4/1995 |
| EP | 0 795 890 A2 | 9/1997 |
| EP | 0 999 192 A1 | 5/2000 |
| JP | 2006117501 A | 5/2006 |
| JP | 2007-516144 A | 6/2007 |
| WO | WO 98/58885 | 12/1998 |
| WO | WO 00/00433 A2 | 1/2000 |
| WO | WO 03/048060 A2 | 6/2003 |
| WO | WO 2005/019127 A1 | 3/2005 |
| WO | WO 2005/034192 A2 | 4/2005 |
| WO | WO 2005/085151 A2 | 9/2005 |

OTHER PUBLICATIONS

International Search Report of PCT/FR2004/001622 mailed Dec. 21, 2004, 4 pages.

* cited by examiner

*Primary Examiner* — Timothy Speer
(74) *Attorney, Agent, or Firm* — Kilpatrick Townsend & Stockton LLP

(57) ABSTRACT

The invention relates to a silver low-E coating for glass which is temperable and can be applied by means of sputter processes onto the glass. The individual layers of the coating are cost-effective standard materials. One embodiment of the invention for example is comprised of a glass substrate, an $Si_3N_4$ layer disposed thereon of a thickness of approximately 15 nm, a $TiO_2$ layer of 15 nm thickness on the $Si_3N_4$ layer, a 12.5 nm thick Ag layer on the $TiO_2$ layer, a $NiCrO_x$ layer of approximately 5 nm thickness on the Ag layer and a terminating 45 nm thick $Si_3N_4$ layer.

15 Claims, No Drawings

TEMPERABLE GLASS COATING

CROSS-REFERENCES TO RELATED APPLICATIONS

This application is a non-provisional, and claims the benefit, of commonly assigned U.S. Provisional Application No. 60/893,764, filed Mar. 8, 2007, entitled "Temperable Glass Coating," the entirety of which is herein incorporated by reference for all purposes.

BACKGROUND OF THE INVENTION

The invention relates to a temperable glass coating according to the preamble of patent claim 1.

Coatings on transparent glass or transparent synthetic material serve to reflect or absorb specific wavelengths or wavelength ranges of incident light. Known are coatings on optical lenses and on window panes, also referred to as architectural glass, as well as the coatings on motor vehicle window panes.

The most important function of a coating on architectural glass is the reflection of thermal radiation in order for a room not to become too warm during the summer and not too cool during the winter. In the process the visible light is to be minimally weakened, i.e. the coating should have high transmission in the visible range (approximately 400 nm to 700 nm under daylight vision and approximately 390 nm to 650 nm under night vision) and high reflection for thermal and infrared radiation (wavelength>700 nm).

Layer systems fulfilling this function are referred to as low-E layer systems, "E" representing emissivity (=degree of emission or emission capability). This is intended to express that these layer systems only output low thermal radiation from a building room to the outside.

As a rule, heat regulation is attained thereby that onto glass electrically high-conducting layers are applied, frequently comprising a metal such as Cu, Ag, Au with a very low radiation emission coefficient.

Due to the light reflection of these low-E layers, which is often too high, these layers are sometimes antireflection-coated with the aid of additional transparent layers. By applying the transparent layers, the desired color tint of the glass pane can also be set.

A coated substrate is already known which comprises at least one metallic coating layer and further dielectric layers (EP 1 089 941 B1). This coated substrate is structured such that it can be tempered and bent.

A substrate provided with a multilayer system is furthermore known which is also temperable and bendable (U.S. Pat. No. 6,576,349 B2, U.S. Pat. No. 6,686,050 B2). The multilayer system utilized herein comprises two layers which reflect infrared radiation and which are each encompassed by two $NiCrO_x$ layers.

Further, a heat-insulating layer system is known which, after the coating, is tempered and bent (DE 198 50 023 A1 or EP 0 999 192 B1). This layer system comprises a precious metal layer disposed on a $TiO_2$ layer, the two layers being encompassed by suboxidic $NiCrO_2$.

Lastly, temperable coatings are also known which utilize substoichiometric $Si_xN_y$ or $SiN_xO_y$ (WO 2005/19127 A1, WO 2005/034192 A2).

The different layers are, as a rule, produced with the aid of sputter processes, in which by means of positive ions particles are knocked out of so-called targets, which particles are subsequently deposited on the substrate, which may be architectural glass.

The known layer systems entail at least one of the following cited disadvantages:
- expensive or exotic starting materials for sputter targets
- complex and complicated process control
- complex layer structuring
- inadequate optical properties
- severe changes of the essential properties of the coated glass by a temper process.

The invention addresses the problem of providing a simple and cost-effective silver low-E coating, which only minimally changes its essential properties after tempering.

BRIEF SUMMARY OF THE INVENTION

A temperable substrate with a coating is disclosed according to one embodiment of the invention. The temperable substrate may include a glass substrate with a first layer comprising $Si_xN_yO_z$ disposed thereon. A second layer comprising $TiO_2$ may be disposed on the first layer. A third layer comprising Ag may be disposed on the second layer. A fourth layer comprising $NiCrO_k$ may be disposed on the third layer. A fifth layer comprising $Si_xN_yO_z$ may be disposed on the fourth layer. The layers that include $Si_xN_yO_z$, $x/y \leq 0.75$, $y/z > 4$, and $0 < k < 2$.

A method of making the above mentioned temperable substrate is also disclosed. The method includes sputtering each of the layers on the substrate.

DETAILED DESCRIPTION OF THE INVENTION

The advantage attained with the invention comprises in particular that only standard target materials, such as boron-doped silicon (Si:B) or titanium-doped silicon aluminum (SiAl:Ti) as well as titanium oxide, silver or nickel-chromium are employed.

Since pure silicon is not conductive, silicon sputter targets must be doped, for example, with boron in order for them to be utilizable at all for DC or MF sputtering. The additives boron, aluminum or titanium, which are also contained in the layer, do not have a negative effect. $Si_3N_4$ comprises only small quantities of oxygen ($O_m$) as layer material.

In the following the process parameters of a sputter process carried out in the production of the invented coating $Si_3N_4$—$TiO_2$—Ag—$NiCrO_x$—$Si_3N_4$ on glass are compiled in the form of a table. The designations used indicate the following:

KT=Cathode
sccm=standard cubic centimeter per minute (also Nml per minute; Nml=standard millimeter)
AC=alternate current
DC=direct current
V=Volt (voltage)
A=Ampere (current)
W=Watt (power)
k=1000
F=$10^{-6}$
bar=0.1 MPa=$10^5$ Pa (Pa=Pascal=pressure)
planar=planar cathode
rot=rotating cathode
:=doped with
KT 1, KT 2 etc. are here the different cathodes of an inline process, past which a substrate—here glass—is successively moved.
m=number greater than or equal to zero.

TABLE 1

| | Cathode | | | | | | | |
|---|---|---|---|---|---|---|---|---|
| | KT 1 | KT 2 | KT 3 | KT 4 | KT 5 | KT 6 | KT 7 | KT 8 |
| | | | | | Material | | | |
| Gas Inlet | $Si_3N_4$ | $TiO_2$ | $TiO_2$ | $TiO_2$ | Ag | $NiCrO_x$ | $Si_3N_4{:}O_m$ | $Si_3N_4{:}O_m$ |
| Argon | 700 sccm | 500 sccm | 450 sccm | 450 sccm | 590 sccm | 480 sccm | 1000 sccm | 1000 sccm |
| Oxygen | 20 sccm | 293 sccm | 274 sccm | 265 sccm | 10 sccm | 40 sccm | 50 sccm | 50 sccm |
| Nitrogen | 585 sccm | 50 sccm | 50 sccm | 50 sccm | 0 sccm | 0 sccm | 1070 sccm | 1195 sccm |
| Process | AC rot | AC rot | AC rot | AC rot | DC planar | DC planar | AC rot | AC rot |
| Pressure | 4.91 µbar | 4.22 µbar | 4.36 µbar | 4.15 µbar | 4.34 µbar | 4.65 µbar | 8.83 µbar | 9.23 µbar |
| Voltage | 340.0 V | 448.0 V | 446.0 V | 447.0 V | 408.0 V | 458.0 V | 265.0 V | 266.0 V |
| Current | 102.0 A | 223.0 A | 224.0 A | 225.0 A | 7.0 A | 6.5 A | 223.0 A | 222.0 A |
| Power | 35.0 kW | 100.0 kW | 100.0 kW | 100.0 kW | 2.7 kW | 2.9 kW | 59.0 kW | 59.0 kW |

The $TiO_2$ layer has here a double function as an antireflecting dielectric and as a seed layer or blocker for the succeeding silver layer. Application of the $TiO_2$ layer as three layers (KT 2, KT 3, KT 4) takes place for the reason that at given substrate rate one cathode alone would not yield the adequate layer thickness. For the same reason the $Si_3N_4{:}O_m$ layer is applied in two steps. Before tempering, none of the layers had a gradient. Special doping in the target material of the sputter process was omitted.

The dielectric layers—$Si_3N_4$ and $TiO_2$—are preferably sputtered from rotating magnetrons. For the $TiO_2$ layer ceramic $TiO_x$ target can be utilized, which can be sputtered using MF techniques (approximately 10 kHz to 80 kHz) or AC techniques or also DC techniques.

The Ag layer and the $NiCrO_x$ layers are typically sputtered from metallic targets by means of DC techniques. For all processes planar and/or rotating targets are conceivable. For $TiO_2$ and $Si_3N_4$ coatings rotating targets have preferably been used for some time. For Ag and $NiCrO_x$ layers planar targets are conventionally used, however rotating targets are also feasible.

As is evident based on Table 1, only small quantities of oxygen are required in the $Si_3N_4$ processes. A high pressure is required in the concluding $Si_3N_4$. $Si_3N_4{:}O$ can generally also be written as $Si_xN_yO_z$, wherein $x/y \leqq 0.75$ and $y/z \geqq 4$ applies. The maximum oxygen flow for the $NiCrO_x$ process occurs on the metal branch of the hysteresis, for which narrow apertures and a gas inlet below this aperture in the sputter chamber are preconditions.

The right columns of Table 1 show ratios $N_2{:}O_2 \geqq 20{:}1$. However, the layers can also be generated for example at a gas flow ratio of $N_2{:}O_2=4{:}1$. The layer composition does not reflect this gas flow ratio of $N_2{:}O_2$. Rather different parameters exert their influence if relatively more oxygen than nitrogen is found in the layers.

By metal branch of the hysteresis the following is understood: if the characteristic at constant power and increasing oxygen flow is plotted against the generator data (current, voltage), the voltage increases up to a certain point, the breakover point. If the oxygen quantity is further increased, the voltage decreases markedly. The process has tipped over from metal mode into oxide mode. If the oxygen is again decreased, a point is reached at which the process tips back again into metal mode. However, the two breakover points are not identical, rather the curve describes a hysteresis (cf. FIG. 1 of EP 0 795 890 A2).

The small quantities of nitrogen in the $TiO_2$ processes are not unusual per se and typical when using metallic targets for the process stabilization. When employing ceramic targets, the nitrogen can be omitted. It is probable that due to the higher pressure and the oxygen in the uppermost layer of $Si_3N_4{:}O$ two parameters are available, which permit the setting of the barrier effect and/or of the internal mechanical layer stress conformed to the coating and the coating installation.

This applies analogously also to the $Si_3N_4$ base layer (KT 1), however, here the increased sputter pressure does not yield any advantages.

With the continuous variation of oxygen flow and working pressure in the two $Si_3N_4$ processes (KT 1 or KT 7 and KT 8) variable parameters are available (thus virtual control levers) to conform the layer system to the particular tempering process. A "tuning range" is consequently available in order to attain for the particular coating installation, glass quality and further processing (specifically the tempering) an optimum conformation on the part of the coating.

The layer combination cited in the Table 1 before and after the tempering has the properties listed in the following Table 2. Herein the symbols and abbreviations of the CIE LAB color system indicate the following:

a*=color value on the red-green axis (dimensionless)
b*=color value on the yellow-blue axis (dimensionless)
Ty=transmission averaged in the visible range in percent
RGy=reflection averaged in the visible range from the glass side of the sample in percent
RFy=reflection averaged in the visible range from the layer side of the sample in percent
Haze=opacity or "milkinessD" (stray-light loss), stray-light component in %
R/sq=surface resistivity in Ohm (cf. Hans Joachim Glaser: Duennfilmtechnologie auf Flachglas, pp. 134-137).

The thickness of the first $Si_3N_4$ layer is preferably 5 to 25 nm. The second layer of $TiO_2$ has preferably also a thickness of 5 to 25 nm. The third layer, comprised of Ag, is preferably 8 to 18 nm thick. The succeeding layer of $NiCrO_k$ is 3 to 8 nm thick. The last layer of $Si_xN_yO_z$ is preferably 25 to 65 nm thick.

TABLE 2

| Before Tempering | | After Tempering | | Difference | |
|---|---|---|---|---|---|
| Ty | 82.25 | Ty | 82.58 | Ty | 1.33 |
| a* | −1.06 | a* | −1.63 | a* | −0.57 |
| b* | 1.93 | b* | 1.26 | b* | −0.67 |
| RGy | 9.95 | RGy | 9.63 | RGy | −0.32 |
| a* | −1.99 | a* | −0.35 | a* | 1.64 |
| b* | −5.70 | b* | −4.78 | b* | 0.92 |
| RFy | 6.43 | RFy | 6.95 | RFy | 0.52 |
| a* | −0.54 | a* | −0.82 | a* | 1.36 |
| b* | −5.36 | b* | −3.87 | b* | 1.49 |

TABLE 2-continued

| Before Tempering | | After Tempering | | Difference | |
|---|---|---|---|---|---|
| Haze | 0.16 | Haze | 0.33 | Haze | 0.17 |
| R/sq | 4.80 | R/sq | 3.30 | R/sq | −1.50 |

Table 2 shows that there are only minimal differences in the essential properties of the coating before and after tempering. The tempering was carried out at a temperature of approximately 620 to 700° C. The substrate was therein heated for 2 to 20 minutes and subsequently cooled very rapidly by means of compressed air.

Adhesive strength was tested by means of the so-called Erichsen Wash Test according to ISO 11998. The results were faultless for all samples. The storage life was also tested, and specifically according to the so-called Storage Test for Resistance to Moisture according to DIN EN ISO 6270 (DIN-50017). Here also only positive values were determined.

In addition, the transmission Ty is above 80%, the layer resistance is less than 5.0 Ohm/sq and for the colors in the reflection from the glass side applies $-4<a^*<0$ as well as $-7<b^*<-2$. The haze is less than 0.5%. The mechanical stability is robust, which could be determined by means of an Erichsen Brush Test with 200 strokes.

In some embodiments, the first layer has a thickness of 15 nm. In some embodiments, the second layer has a thickness of 15 nm. In some embodiments, the third layer has a thickness of 12.5 nm. In some embodiments, the fourth layer has a thickness of 5 nm. In some embodiments, the fifth layer has a thickness of 40 to 50 nm.

In some embodiments, a temperable substrate can include a layer for setting the transmission that is disposed between the second layer and the third layer. In some embodiments, this layer for setting the transmission can be transmission-increasing, can include ZnO, and can have a thickness of 4 to 20 nm. In some embodiments, this layer for setting the transmission can be transmission-increasing, can include ZnO:Al, and can have a thickness of 5 to 10 nm. In some embodiments, this layer for setting the transmission can be transmission-decreasing, can include NiCrO, and can have a thickness of 2 to 5 nm.

What is claimed is:

1. A temperable substrate with a coating, comprising:
   a glass substrate;
   a first layer comprising $Si_xN_yO_z$ disposed on the glass substrate;
   a second layer comprising $TiO_2$ disposed on the first layer;
   a third layer comprising Ag disposed on the second layer;
   a fourth layer comprising $NiCrO_k$ disposed on the third layer; and
   a fifth layer comprising $Si_xN_yO_z$ disposed on the fourth layer, wherein $x/y \leq 0.75$, $y/z>4$, $z>0$, and $0<k<2$.

2. The temperable substrate according to claim 1, wherein the second layer has a thickness of approximately 5 to 25 nm.

3. The temperable substrate according to claim 2, wherein the second layer has a thickness of 15 nm.

4. The temperable substrate according to claim 1, wherein the third layer has a thickness of approximately 8 to 18 nm.

5. The temperable substrate according to claim 4, wherein the third layer has a thickness of 12.5 nm.

6. The temperable substrate according to claim 1, wherein the fourth layer has a thickness of 3 to 8 nm.

7. The temperable substrate according to claim 6, wherein the fourth layer has a thickness of 5 nm.

8. The temperable substrate according to claim 1, wherein the fifth layer has a thickness of 25 to 65 nm.

9. The temperable substrate according to claim 8, wherein the fifth layer has a thickness of 40 to 50 nm.

10. The temperable substrate according to claim 1, further comprising a layer for setting the transmission that is disposed between the second layer and the third layer.

11. The temperable substrate according to claim 10, wherein:
    the layer for setting the transmission is transmission-increasing;
    the layer for setting the transmission comprises ZnO; and
    the layer for setting the transmission comprised has a thickness of 4 to 20 nm.

12. The temperable substrate according to claim 10, wherein:
    the layer for setting the transmission is transmission-increasing;
    the layer for setting the transmission comprises ZnO:Al; and
    the layer for setting the transmission comprised has a thickness of 5 to 10 nm.

13. The temperable substrate according to claim 10, wherein:
    the layer for setting the transmission is transmission-reducing;
    the layer for setting the transmission comprises NiCrO; and
    the layer for setting the transmission comprised has a thickness of 2 to 5 nm.

14. The temperable substrate according to claim 1, wherein the first layer has a thickness of approximately 5 to 25 nm.

15. The temperable substrate according to claim 14, wherein the first layer has a thickness of 15 nm.

* * * * *

UNITED STATES PATENT AND TRADEMARK OFFICE
CERTIFICATE OF CORRECTION

PATENT NO. : 8,133,589 B2
APPLICATION NO. : 11/769934
DATED : March 13, 2012
INVENTOR(S) : List et al.

Page 1 of 1

It is certified that error appears in the above-identified patent and that said Letters Patent is hereby corrected as shown below:

Column 6, line 2, please delete "$x/y \leq 0.75$" and insert --$x/y < 0.75$--

Signed and Sealed this
Twenty-ninth Day of May, 2012

David J. Kappos
*Director of the United States Patent and Trademark Office*